Figure 1:

(No Model.)

L. L. BURDON.
INGOT FOR MAKING SEAMLESS PLATED WIRE.

No. 391,736. Patented Oct. 23, 1888.

WITNESSES.
Charles Hannigan
Joseph Sanford.

INVENTOR.
Levi L. Burdon.
by Remington & Heuston
Atty's.

UNITED STATES PATENT OFFICE.

LEVI L. BURDON, OF PROVIDENCE, RHODE ISLAND, ASSIGNOR TO THE BURDON SEAMLESS FILLED WIRE COMPANY, OF SAME PLACE.

INGOT FOR MAKING SEAMLESS-PLATED WIRE.

SPECIFICATION forming part of Letters Patent No. 391,736, dated October 23, 1888.

Application filed April 6, 1888. Serial No. 269,783. (No model.)

*To all whom it may concern:*

Be it known that I, LEVI L. BURDON, a citizen of the United States, residing at Providence, in the county of Providence and State of Rhode Island, have invented certain new and useful Improvements in Ingots for Making Seamless-Plated Wire; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the manufacture of compound or soldered seamless-plated cylindrical ingots it has been the practice heretofore, so far as I am aware, to turn the center portion, or base-metal core, to a substantially-uniform diameter throughout its length, the seamless tube of fine metal being in like manner cylindrical and adapted to receive and be soldered to the core. Compound ingots of this class are adapted to be subsequently reduced or drawn into wire and made into chains, rings, and other articles of jewelry. An objection to the cylindrical form of compound ingot is that during the process of soldering the shell or tube of the core, the parts being in a vertical position within the furnace, the shell while thus expanded by the heat frequently becomes displaced and sometimes drops off from the core. In some instances a support has been placed beneath the parts to prevent the tube from thus falling while being subjected to the soldering process. This results in an unequal distribution of the solder as it fuses and runs down and around the core, from the fact that a slight excess of heat or pressure on one side of the ingot will cause the shell to move slightly in a lateral direction, thereby obviously producing an unequal thickness or film of solder, as before stated. In fact it not unfrequently happens that owing to this cause alone certain portions of the shell fail to become soldered to the core. During the subsequent process of reducing the ingot these unsoldered places become developed and are termed "blisters." Such imperfections materially increase the percentage of waste stock, and consequently increase the cost of manufacture.

The object of my present invention is to overcome the objection or disadvantage before stated. To this end I make the center portion or base-metal core of the ingot tapering throughout its length—that is, larger at one end than at the other—or having the form of a cone-frustum. The seamless tube or shell has a corresponding shape and is adapted to be placed over the core and then soldered thereto. In the practice of uniting these parts I preferably provide a chamber or reservoir at the upper end in which to place solder. Now upon suspending them vertically in a suitably-heated furnace the solder melts and runs down and around the core in an unbroken film. In case the shell expands faster than the core it simply drops a short distance, or until it more closely engages a corresponding section thereof, the conical form obviously serving to automatically center the shell thereon. Another advantage of the cone-shaped ingot is that it is more readily reduced while passing through the "breaking-down" operation preparatory to being passed through the "draw-plate," all as will be more fully hereinafter set forth and claimed.

Figure 2:
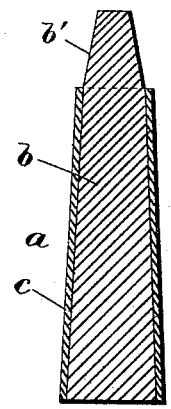
Figure 3:
Figure 4:
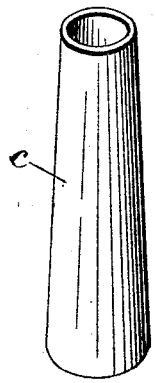
Figures 5, 6:
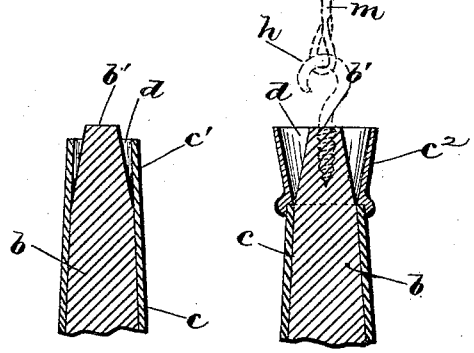

In the accompanying sheet of drawings, Figure 1 represents a side elevation of the cone-shaped ingot in reduced scale. Fig. 2 is a longitudinal section taken through the center of the ingot. Fig. 3 is a perspective view of the center portion or base-metal core. Fig. 4 is a similar view of the seamless fine-metal shell. Fig. 5 is a central sectional view taken through the upper portion of the ingot, and showing the shell extended to produce a chamber adapted to retain solder; and Fig. 6 is a similar sectional view showing another way of constructing the solder-holding chamber.

The following is a detailed description of my invention and including the manner of its construction and general operation:

*a* (referring to the drawings) designates my improved compound ingot, the same having the form of a cone-frustum.

*b* indicates the core or center portion, made from any suitable base metal or compositions of metal, as common to compound ingots of this class. The surface of the core is made true and conical, the upper portion, $b'$, being preferably contracted and extended beyond the seamless shell, as clearly shown in Fig. 2, &c.

$c$ designates the gold shell, the same having a conical form and being substantially the same size internally as the plain portion of the core just described. The shell is seamless and may be drawn into shape from a disk form in a swaging-press provided with suitable dies. Obviously the shell which forms the plating of the ingot may be made of gold alloyed with suitable metals, or of silver, &c. In order to form a reservoir or chamber, $d$, for holding solder, the upper or small end of the shell may be extended, as at $c'$, Fig. 5, or the same result may be effected by centering a metallic funnel-shaped removable piece, $c^2$, upon the upper end of the shell, thereby surrounding and inclosing the reduced portion $b'$ of the core, as clearly represented in Fig. 6.

The manner of uniting the shell and core is as follows: We will first assume that the core $b$ and the seamless shell $c$ have been shaped substantially as shown in the drawings, the shell inclosing the core, and that a chamber or reservoir, $d$, is formed in which to place solder. Now the whole is suspended vertically in a suitably-heated furnace by means, say, of a chain or rod whose lower end, $m$, is adapted to receive a hook, $h$, screwed into the small end of the core, as shown by dotted lines in Fig. 6. If necessary, the rod $m$ may be revolved slowly, thereby causing the ingot to be uniformly heated. When a sufficient heat has been attained, the solder (previously placed in the chamber $d$) fuses and runs down in a film around the surface of the core. During this heating process in case the shell expands to a greater degree than the core the former will simply drop a short distance along the core, but at the same time it is automatically centered thereon, so that the relative position of the parts always remains the same centrally. After the union of the parts has been accomplished the ingot is withdrawn from the furnace, the walls of the solder-holding chamber are removed, and the ingot is then ready to be passed through the breaking-down rolls, &c., to reduce it, as usual.

I claim as my invention—

1. As an improved article of manufacture, a compound ingot having the form of a cone-frustum, substantially as hereinbefore described.

2. The compound ingot hereinbefore described, consisting of the base-metal core portion having one end considerably larger in diameter than the other, and a seamless-shell portion having its interior substantially the same form and size as the core portion.

3. The compound ingot hereinbefore described, the same consisting of a base-metal core portion somewhat larger at one end than the other, and having a reduced end, as $b'$, adapted to first enter the reducing-rolls, and a seamless shell of fine metal soldered to the core.

4. The compound ingot hereinbefore described, the same consisting of a base-metal core portion somewhat larger at one end than the other, and a seamless shell of fine metal having its interior substantially the same form and size as the core portion, and having a solder-retaining chamber or reservoir, as $d$, at the small end of the ingot, substantially as set forth.

In testimony whereof I have affixed my signature in presence of two witnesses.

LEVI L. BURDON.

Witnesses:
CHARLES HANNIGAN,
GEO. H. REMINGTON.